United States Patent
Tsai et al.

(10) Patent No.: US 7,626,899 B2
(45) Date of Patent: Dec. 1, 2009

(54) METHOD FOR OBTAINING AN OPTIMUM FOCUSING POINT OF AN OPTICAL PICKUP UNIT AND A SERVO SYSTEM OF AN OPTICAL DISK DRIVE USING THIS METHOD

(76) Inventors: Chin-Yin Tsai, 7F, No. 14, Tzchiang Rd., Junghe City, Taipei (TW); Yi-Lin Lai, No. 74, Lane 290, Diauhe St., Jungieng Chiu, Keelung (TW)

( * ) Notice: Subject to any disclaimer, the term of this patent is extended or adjusted under 35 U.S.C. 154(b) by 355 days.

(21) Appl. No.: 10/913,241

(22) Filed: Aug. 6, 2004

(65) Prior Publication Data
US 2005/0030848 A1 Feb. 10, 2005

Related U.S. Application Data

(60) Provisional application No. 60/493,078, filed on Aug. 6, 2003.

(51) Int. Cl.
*G11B 7/00* (2006.01)
(52) U.S. Cl. .................. 369/44.34; 369/44.29
(58) Field of Classification Search .............. 369/44.25, 369/44.26, 44.35, 44.36, 53.22, 44.41, 44.34, 369/44.27, 44.28, 44.29, 124.01, 124.03, 369/44.32, 59.15
See application file for complete search history.

(56) References Cited

U.S. PATENT DOCUMENTS

| | | | | |
|---|---|---|---|---|
| 4,998,233 A | * | 3/1991 | DiMatteo et al. | 369/44.25 |
| 5,048,002 A | * | 9/1991 | Horie et al. | 369/44.35 |
| 5,101,395 A | * | 3/1992 | Cardero et al. | 369/59.15 |
| 5,251,194 A | * | 10/1993 | Yoshimoto et al. | 369/44.26 |
| 5,343,454 A | * | 8/1994 | Watanabe et al. | 369/44.32 |
| 5,481,526 A | * | 1/1996 | Nagata et al. | 369/44.29 |
| 5,490,127 A | * | 2/1996 | Ohta et al. | 369/47.51 |
| 6,115,334 A | * | 9/2000 | Tsutsui et al. | 369/44.32 |
| 6,396,780 B1 | * | 5/2002 | Nakabori et al. | 369/44.37 |
| 6,760,285 B2 | * | 7/2004 | Hirashima et al. | 369/44.25 |
| 6,778,473 B1 | * | 8/2004 | Tomita et al. | 369/44.26 |
| 6,917,571 B2 | * | 7/2005 | Kusumoto et al. | 369/44.29 |
| 6,946,633 B2 | * | 9/2005 | Takaba et al. | 250/201.5 |
| 6,992,954 B2 | * | 1/2006 | Tsai et al. | 369/44.32 |

FOREIGN PATENT DOCUMENTS

JP 6-150336 * 5/1994

* cited by examiner

*Primary Examiner*—Nabil Z Hindi
(74) *Attorney, Agent, or Firm*—Perkins Coie LLP

(57) ABSTRACT

A method for obtaining an optimum focusing point of an optical pickup unit and a servo system of an optical disk drive using this method is disclosed. An optical pickup drive circuit controls a position of an optical pickup unit according to an optical pickup control signal. A compensator receives an input signal and thus generates the optical pickup control signal. By varying levels of the input signal may enable the optical pickup unit to move to different positions. The optical pickup control signal enables the optical pickup unit to move to an optimum focusing point when the input signal activates the optical pickup unit to achieve the situation that an average difference between a peak envelop and a bottom envelop of the optical pickup control signal is minimized, or that an amplitude and a level of the tracking error signal are maximized in accompanied with minimum distortion range.

6 Claims, 4 Drawing Sheets

METHOD FOR OBTAINING AN OPTIMUM FOCUSING POINT OF AN OPTICAL PICKUP UNIT AND A SERVO SYSTEM OF AN OPTICAL DISK DRIVE USING THIS METHOD

This application claims the benefit of U.S. provisional application Ser. No. 60/493,078, filed Aug. 6, 2003, the subject matter of which is incorporated herein by reference.

BACKGROUND OF THE INVENTION

1. Field of the Invention

The invention relates in general to a servo system of an optical disk drive, and more particularly to a method for obtaining an optimum focusing point of an optical pickup unit and a servo system of an optical disk drive using this method.

2. Description of the Related Art

FIG. 1 is a block diagram showing a conventional servo system of an optical disk drive. An optical sensor 102 receives an optical signal reflected from an optical disk 122, and then converts the reflected optical signal into an electric signal before delivering to a pre-amplifier 104 to derive required tracking error signal Te/focusing error signal Fe. The tracking error signal Te/focusing error signal Fe is directed to a compensator 108, which compensates for the gain and phase thereof, and then an optical pickup control signal Foo is obtained. An optical pickup drive circuit 114 receives the optical pickup control signal Foo and generates a control signal T/F used for controlling the position of the optical pickup unit 116. The laser diode (not shown) in the optical pickup unit 116 generates a laser light beam projecting onto the disk 122 during disk-read/write operations.

FIG. 2 shows an exemplary level curve of a focusing error signal Fe with respect to the brightness emitted from the optical pickup unit 116 used for read/write a blank optical disk in the conventional optical disk drive. Assume that the optical pickup unit 116 is positioned at the P point with the Fe signal level at A after related focusing procedure for the optical pickup unit is completed. In this case, the brightness projected onto the blank optical disk is L1, which is usually deviated from the maximum brightness L2 (and the optical pickup unit should be positioned at point Q). Obviously, disk-read/write operations may perform and operate quite well when the optical pickup unit is positioned at the optimum focusing point Q. There is a need to design a servo system of an optical disk drive for finding the optimum focusing point Q such that the optical pickup unit may be moved to this optimum focusing point so as to facilitate the subsequent reading/recording operation on a blank optical disk.

SUMMARY OF THE INVENTION

It is therefore an object of the invention to provide a method for obtaining an optimum focusing point of an optical pickup unit and a servo system of an optical disk drive using this method. The optimum focusing point can be effectively found by using the disclosed method such that the optical pickup unit can be moved to the optimum focusing point so as to facilitate the subsequent reading/recording operation for blank optical disks.

The invention achieves the above-identified object by providing a servo system of an optical disk drive including an optical pickup unit, an optical pickup drive circuit and a compensator. The optical pickup drive circuit controls a position of the optical pickup unit according to an optical pickup control signal. The compensator receives an input signal derived by summing a tracking error Te/focusing error signal Fe and an additionally introduced voltage offset signal and thus generates the optical pickup control signal. Different levels of the additionally introduced voltage offset signal may enable the optical pickup unit to move to different positions so as to obtain different focusing points. The optical pickup control signal enables the optical pickup unit to move to the optimum focusing point when the input signal activates the optical pickup unit to achieve the situation that an average difference between a peak envelope and a bottom envelope of the optical pickup control signal is minimized, or that an amplitude and a level of the tracking error signal are maximized accompanied with a minimum distortion range.

The invention also achieves the above-identified object by providing a method for obtaining an optimum focusing point of an optical pickup unit including the steps as follows: varying a signal level of the input signal to vary a waveform of the focusing error signal or the tracking error signal; and determining whether or not an average difference between a peak envelope and a bottom envelope of the optical pickup control signal is minimized, or an amplitude and a level of the tracking error signal are maximized and a distortion range is minimized, wherein the input signal enables the optical pickup to move to an optimum focusing point when the average difference is minimized or the amplitude and the level of the tracking error signal are maximized accompanied with minimum distortion range.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
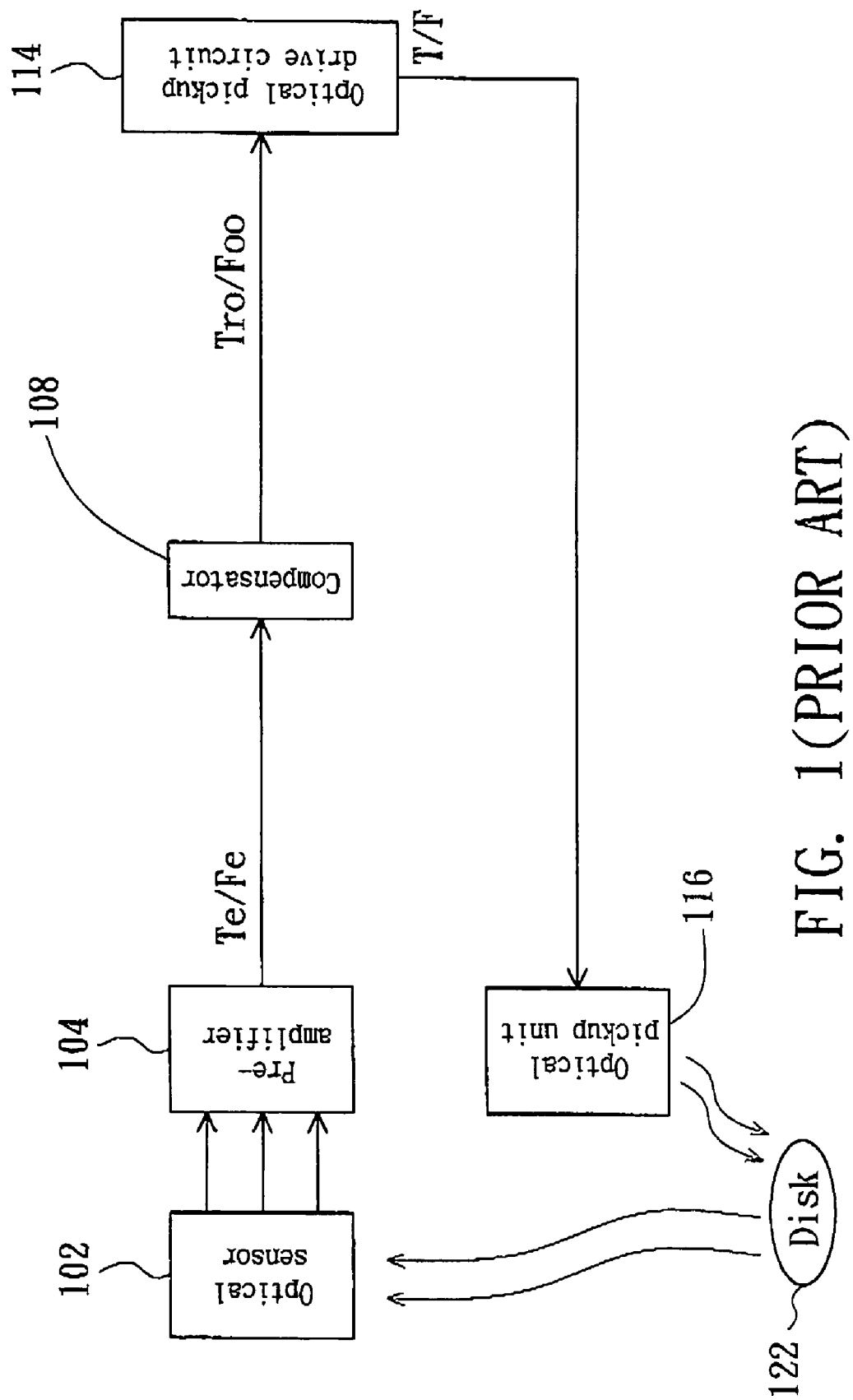
FIG. 1 is a block diagram showing a conventional servo system of an optical disk drive.
Figure 2:
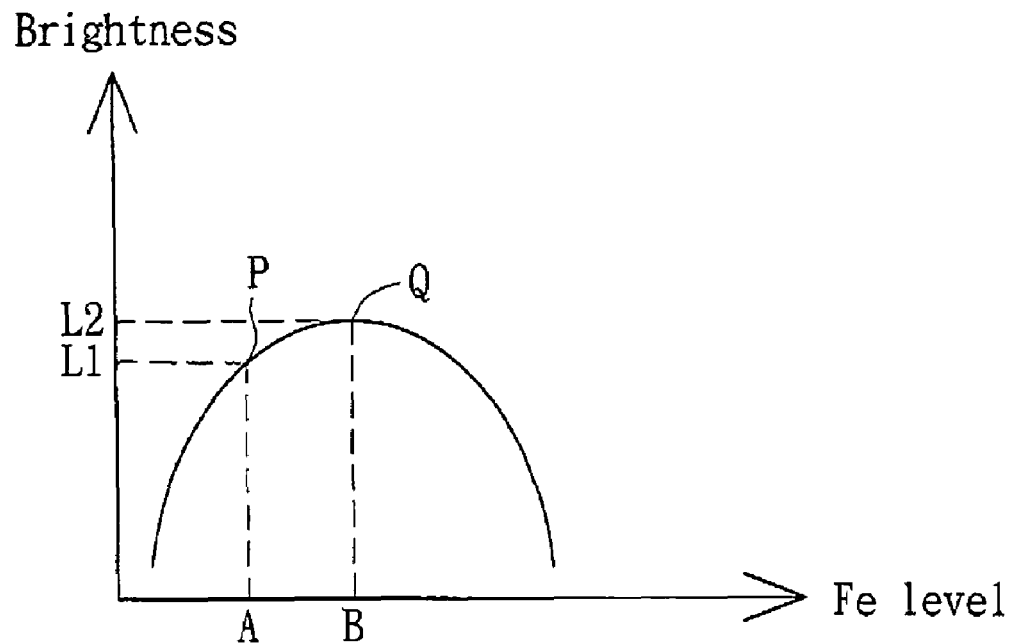
FIG. 2 shows an associated level curve of a focusing error signal Fe with respect to the brightness of a blank optical disk in the conventional optical disk drive.
Figure 3A:
FIG. 3A shows the waveform of the tracking error signal Te when the optical pickup unit is positioned at the optimum focusing point Q.

A blank optical disk still encompasses data tracks although no data is recorded thereon currently. FIG. 3A shows an exemplary waveform of the tracking error signal Te when the focusing point of the optical pickup unit is at the optimum focusing point Q. Conversely, FIGS. 3B and 3C respectively show the first and second waveforms of the tracking error signal Te' and Te" when the optical pickup unit is not positioned at the optimum focusing point Q.

Figure 3B:
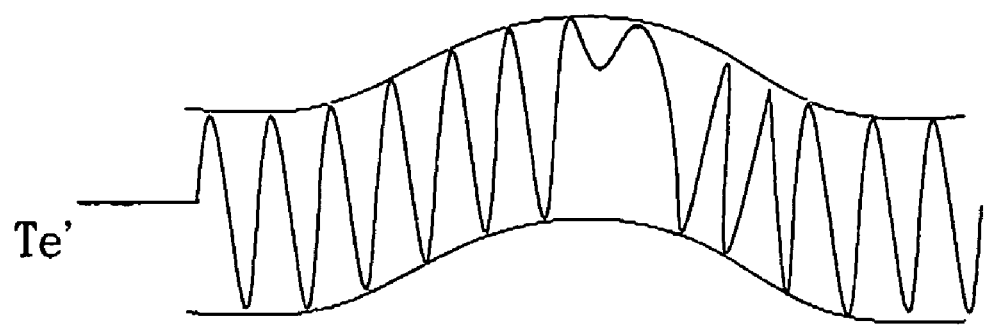
FIG. 3B shows the first exemplary waveform of the tracking error signal Te' when the optical pickup unit is not positioned the optimum focusing point Q.
Figure 3C:
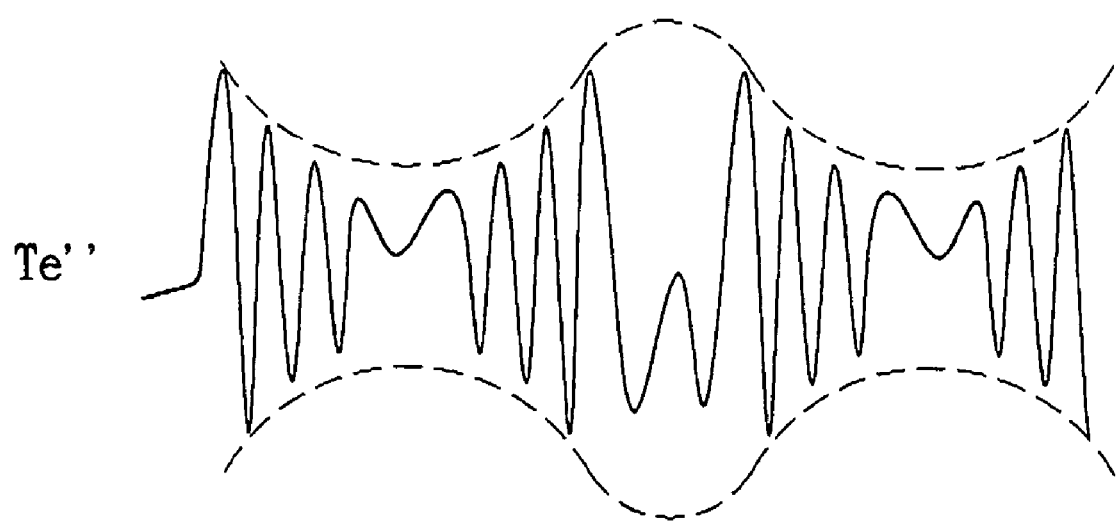
FIG. 3C shows the second exemplary waveform of the tracking error signal Te" when the focusing point of the optical pickup unit is not positioned at the optimum focusing point Q.

As shown in FIGS. 3B and 3C, when the optical pickup unit is not located at the optimum focusing point Q, the tracking error signal Te' and the tracking error signal Te" will deform, distort, or reduce from the normal. Therefore, the optimum focusing point Q may be obtained when the maximum signal amplitude accompanied with minimum distortion range in the waveform of signal Te is found.

Figure 4:
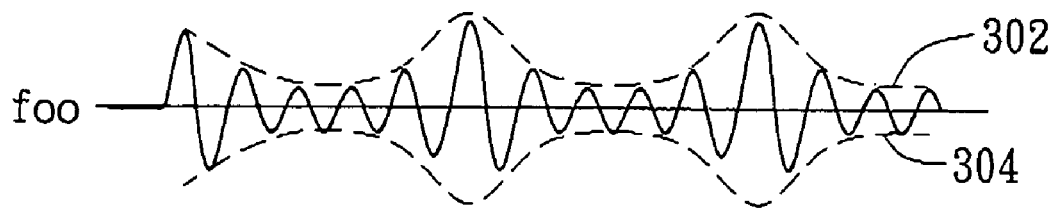
FIG. 4 shows an exemplary waveform of the optical pickup control signal Foo when the optical pickup is positioned at the optimum focusing point Q.

In addition, the optimum focusing point Q also may be determined according to the optical pickup control signal Foo. FIG. 4 shows the waveform of the optical pickup control signal Foo when the focusing point of the optical pickup unit is at the Q point. As shown in FIG. 4, when the optical pickup unit is positioned at the Q point, an average difference between a peak envelope 302 and a bottom envelope 304 of the optical pickup control signal Foo will be minimized. So, the optimum focusing point of the optical pickup unit is determined when the minimum average difference between the peak envelope 302 and the bottom envelope 304 of the optical pickup control signal Foo is found. Please note that a threshold may be preset such that the optimum focusing point may be obtained when the difference average value is substantially less than the threshold. Moreover, any ordinary person having skills in the art may modify the threshold by experience or applications, but any similar variations or modifications within the spirits of the embodiment should be included in the appended claims.

Figure 5:
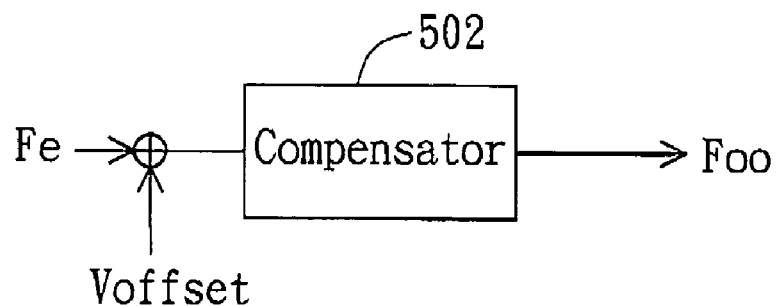
FIG. 5 is a block diagram showing a portion circuit in the servo system for adjusting the position of the optical pickup unit so as to obtain the optimum focusing point according to the present invention.

FIG. 5 is a block diagram showing an exemplary diagram used for adjusting the position of the optical pickup unit so as to obtain the optimum focusing point according to the present invention. In the servo system of the optical disk drive, an additional compensating voltage value Voffset, is introduced and summed with the focusing error signal Fe before feeding into a compensator 502 while the compensator 502 generates the optical pickup control signal Foo according to the signal summation of Fe and Voffset. The optical pickup drive circuit (not shown) then controls the position of the optical pickup unit according to the indication of the optical pickup control signal Foo.

Figure 6:
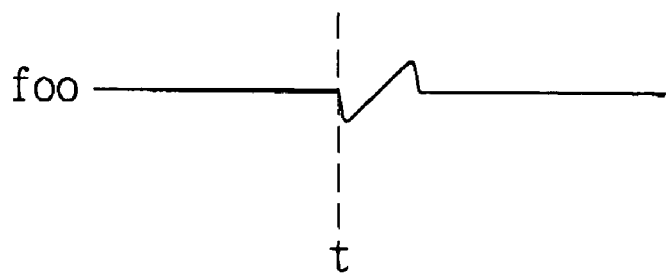
FIG. 6 shows an exemplary waveform of the optical pickup control signal Foo when the compensating voltage value Voffset is introduced at time instant t.

FIG. 6 shows the waveform of the optical pickup control signal Foo when the compensating voltage value Voffset is varied at time instant t. At the instant t when the compensating voltage value Voffset is introduced, jitters will occur in the waveform of the optical pickup control signal Foo.

In the embodiment, signals Voffset with different voltage levels are employed to vary the waveforms of the focusing error signal Fe and the tracking error signal Te. The optical pickup control signal enables the optical pickup unit to move to an optimum focusing point Q when the inputted Voffset signal activates the optical pickup unit to achieve the situation that an average difference between a peak envelope 302 and a bottom envelope 304 of the optical pickup control signal is minimized, or that an amplitude and a level of the tracking error signal are maximized accompanied with minimum distortion range.

In addition, the disclosed method is useful for compensating fabrication error when assembling the optical pickup unit into a loading device of the optical disk drive. The loading device of the optical disk drive including a spindle motor and the optical pickup unit provide a mechanism for a user to place an optical disk onto the disk tray such that the spindle motor may rotate the loaded optical disk to read/write data therefrom/thereon. The invention can compensate for this fabrication error such that the optical disk drive can write/read the data on the disk more correctly. Please note that any kind of blank optical disks, such as CD-R, CD-RW, DVD-R, DVD+R, DVD-RW disks, may employs the disclosed method to perform so-called focus balance operation. However, the disclosed method may be employed in focus balance operations of non-blank optical disks if necessary.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method performed by a servo system of an optical disk drive to select a position of an optical pickup unit, the method comprising:

receiving a first tracking error signal having a first amplitude, a first level, and a first distortion, receiving a first focusing error signal;

summing the first focusing error signal and a compensating voltage signal to produce an optical pickup control signal that controls a position of an optical pickup unit; and varying the compensating voltage signal to produce a second tracking error signal having a second amplitude, a second level, and a second distortion, wherein the second amplitude is greater than the first amplitude, the second level is greater than the first level, and a the second distortion is less than the first distortion.

2. The method of claim 1 further comprising varying the compensating voltage signal so that an average difference between a peak envelope and a bottom envelope of the optical pickup control signal is minimized.

3. The method of claim 1 further comprising varying the compensating voltage signal so that an average difference between a peak envelope and a bottom envelope of the optical pickup control signal is less than a specified threshold value.

4. The method of claim 1 wherein the tracking error signals and the focusing error signals are received from an amplifier and the compensating voltage signals are summed with the amplified signals.

5. The method of claim 1 wherein varying the compensating voltage signal produces a second focusing error signal wherein a second focusing error corresponding to the second focusing error signal is less than a first focusing error corresponding to the first focusing error signal.

6. The method of claim 1 wherein the compensating voltage signal is summed with the first focusing error signal after the first focusing error signal is generated by an amplifier but before the first focusing error signal is fed to a compensator that generates the optical pickup control signal.

* * * * *

UNITED STATES PATENT AND TRADEMARK OFFICE
CERTIFICATE OF CORRECTION

| | | |
|---|---|---|
| PATENT NO. | : 7,626,899 B2 | Page 1 of 1 |
| APPLICATION NO. | : 10/913241 | |
| DATED | : December 1, 2009 | |
| INVENTOR(S) | : Tsai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Twenty-eighth Day of September, 2010

David J. Kappos
*Director of the United States Patent and Trademark Office*